United States Patent [19]

Sticht et al.

[11] Patent Number: 5,062,368

[45] Date of Patent: Nov. 5, 1991

[54] ASSEMBLY LINE FOR WORKING AND MOUNTING STRUCTURAL PARTS

[75] Inventors: Walter Sticht, Attnang-Puchheim; Roland Heiml, Vöcklamarkt, both of Austria

[73] Assignee: STIWA-Gertigungstechnik Sticht Gesellschaft m.b.H., Attnang-Puchheim, Austria

[21] Appl. No.: 490,391

[22] Filed: Mar. 8, 1990

[30] Foreign Application Priority Data

Mar. 8, 1989 [AT] Austria ................................. 530/89

[51] Int. Cl.⁵ ............................................. B61J 3/04
[52] U.S. Cl. .................................. 104/172.3; 104/35; 198/465.1
[58] Field of Search .......................... 198/465.1–465.3, 198/803.01; 104/172.3, 35

[56] References Cited

U.S. PATENT DOCUMENTS

| 3,057,456 | 10/1962 | Heinzer | 198/465.1 |
|---|---|---|---|
| 4,029,961 | 6/1977 | Lohr et al. | 198/465.2 |
| 4,077,327 | 3/1978 | Ziegenfus et al. | 104/35 |
| 4,279,337 | 7/1981 | Kachnik | 198/465.1 |
| 4,492,297 | 1/1985 | Sticht . | |
| 4,502,585 | 3/1985 | Sticht . | |
| 4,513,854 | 4/1985 | Prodel et al. | 198/465.1 |
| 4,619,205 | 10/1986 | Sticht . | |
| 4,696,236 | 9/1987 | Kanayama | 199/803.01 |

FOREIGN PATENT DOCUMENTS

| 52108 | 3/1983 | Japan | 104/172.3 |
|---|---|---|---|
| 77009 | 5/1985 | Japan | 104/172.3 |

Primary Examiner—Joseph E. Valenza
Attorney, Agent, or Firm—Collard, Roe & Galgano

[57] ABSTRACT

The disclosure describes a production plant (1) for the machining or assembly of components (3) transported on workpiece carriers, which has lateral guide lanes and vertical guide lanes (13, 14) and a feed device (15), arranged independently of the latter devices, for the workpiece carriers. This comprises lane sections (11, 12) arranged successively, each one of which is assigned at least one feed device (15) of its own, which is independent of the adjacent sections and has a belt-type driving element (30) and that two vertical guide lanes (13) are arranged spaced apart across the conveying direction, which are assigned the belt-type driving element (30) and the feed drive (15) forms a lateral guide lane (14).

11 Claims, 9 Drawing Sheets

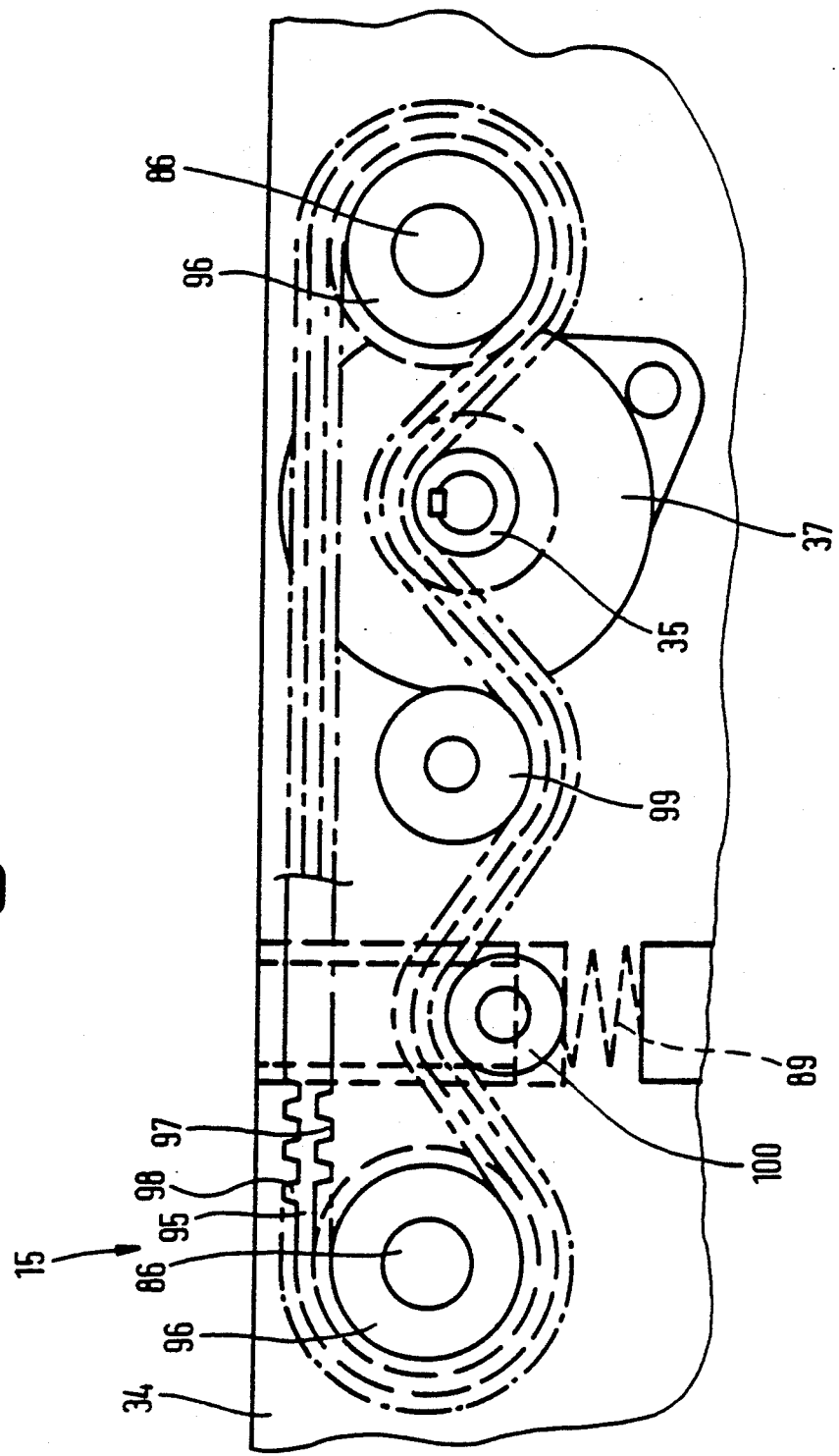

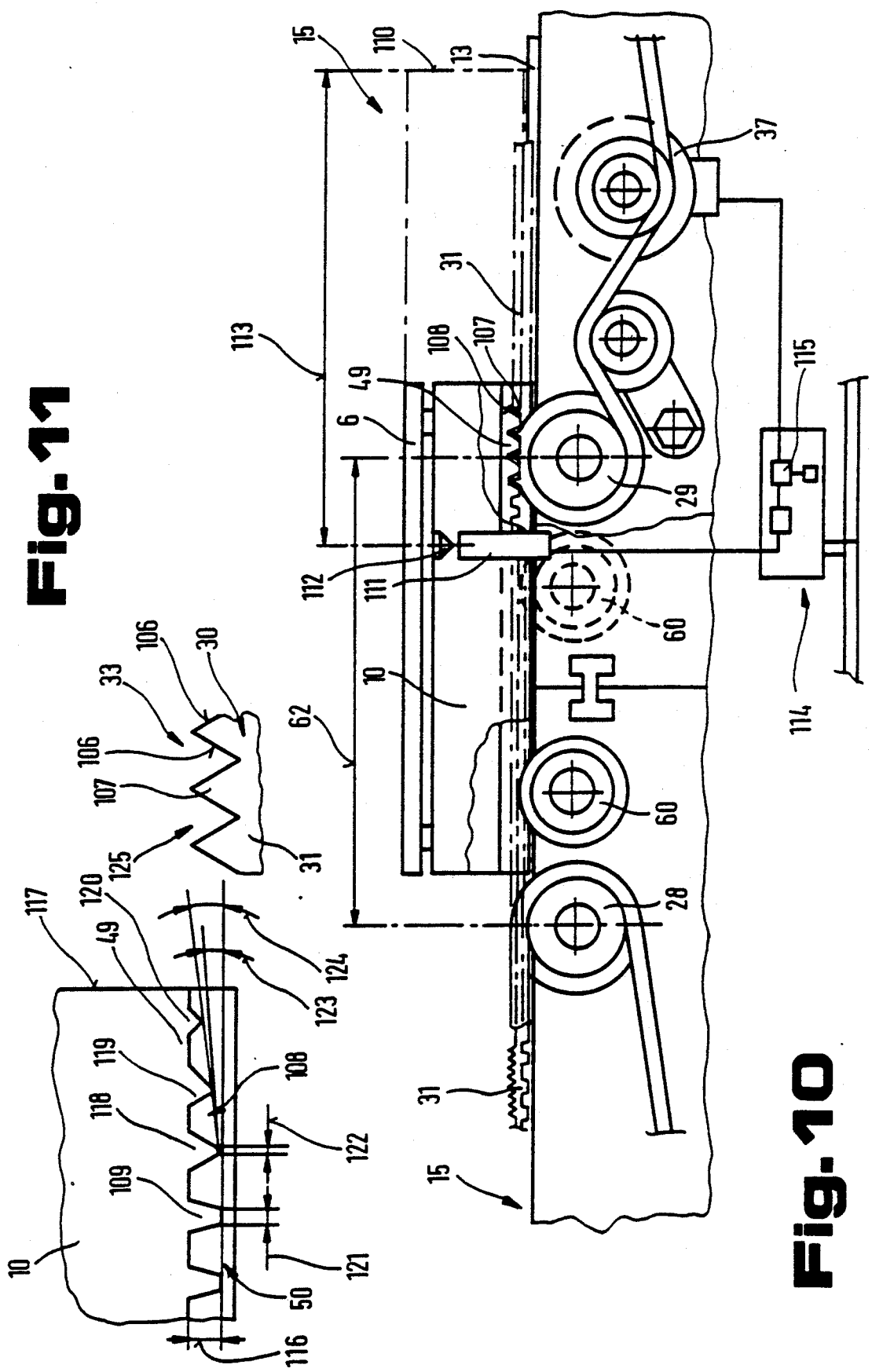

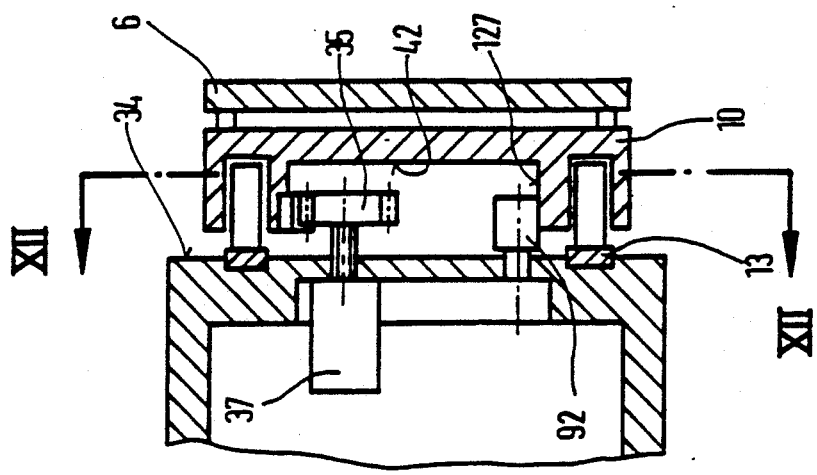
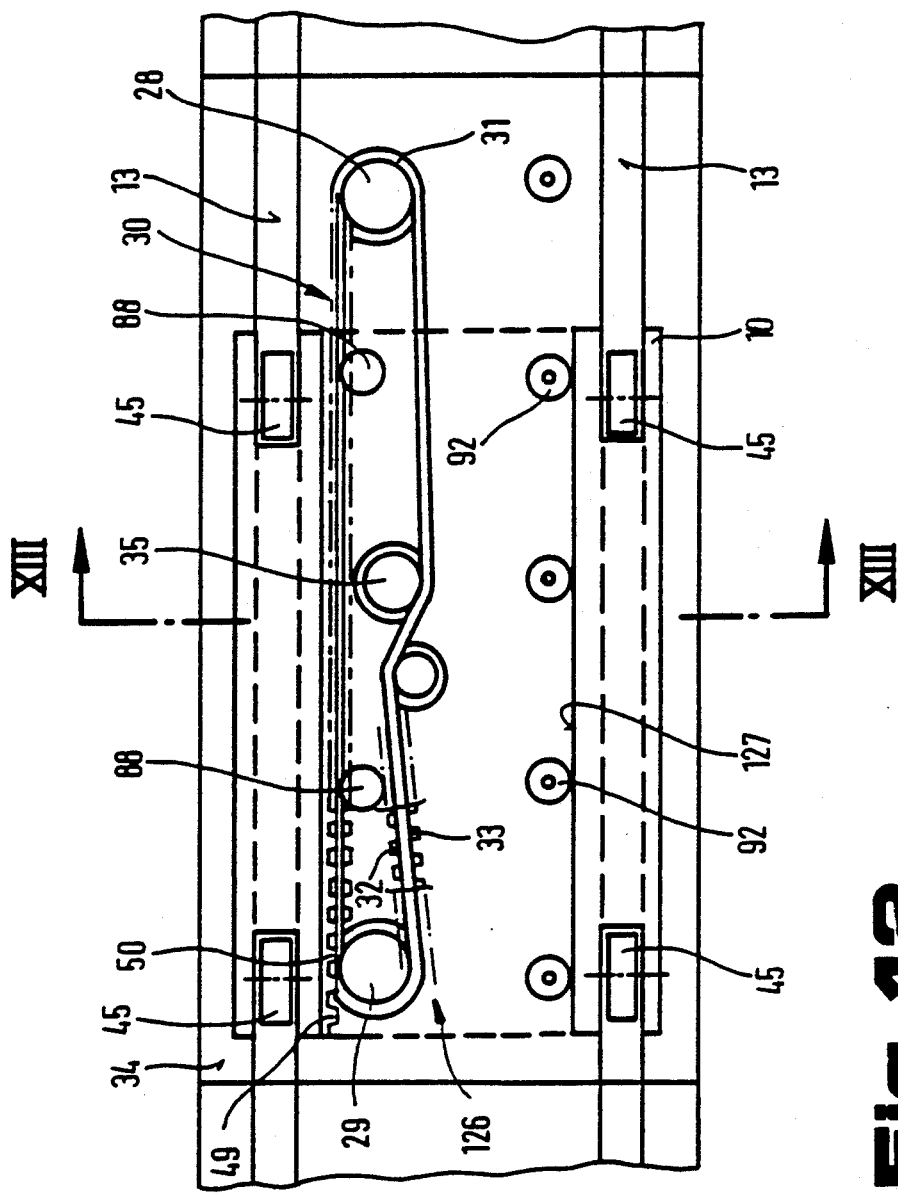
Fig. 13
Fig. 12

ASSEMBLY LINE FOR WORKING AND MOUNTING STRUCTURAL PARTS

The invention relates to a driving device for the machining or assembly of components transported on workpiece carriers, having a lateral guide device and a vertical guide device and having a feed device, arranged independently of the latter devices, for the workpiece carriers, having a plurality of lane sections arranged successively, each one of which is assigned at least one feed device of its own, which is independent of the adjacent sections and has a belt-type driving element Various driving devices for workpiece carriers in automatic machining or assembly plants are already known according to U.S. Pat. No. 4,619,205 of the same inventor —in which the lanes for the workpiece carriers are composed of a plurality of transport or work stations joined together which form a continuous lane with vertical and lateral guide lanes for the workpiece carriers and which are each assigned a single driving member for the workpiece carriers or a plurality of driving members arranged successively for each station. These are formed by belt-type driving members rotating about axles aligned in particular perpendicular to the conveying plane. Thus it is also provided inter alia for continuously rotating belts to be used which are assigned to the lateral surfaces of the workpiece carriers and are pressed against these lateral surfaces via pressing devices which are resilient across the conveying direction. By this means, a good friction-tight fit between the rotating belt-type driving elements, for example V-belts or flat belts, is achieved and thus a transmission of the feed forces onto the workpiece carriers which is essentially without play. These driving systems are primarily also suitable for so-called loose-chained units in which the workpiece carriers are moved independently of one another along the lateral and vertical guide lanes and thus, in the case of disturbances at one work station, the workpiece carriers can continue to be conveyed independently of that work station at the other work stations.

Furthermore, a driving arrangement for a production plant for the manufacture of components in two or more stages is known —according to U.S. Pat. Nos. 4,492,297 and 4,502,585—which has a linear conveyor route which is arranged in portions at machining and assembly stations forming the production plant. The driving and conveying unit has a longitudinal guide device for the workpieces or workpiece carriers which comprises two longitudinal guide lanes spaced apart across the conveying direction for lateral guidance and a longitudinal guide for vertical guidance. The longitudinal guide lanes and the longitudinal guide are assigned conveyor drives which engage friction-tightly with the outer surface of the workpieces or workpiece carriers. The individual conveyor drives are spaced apart in the conveying direction of the longitudinal guide so that access to the workpieces or workpiece carriers is possible from below. This drive and conveying unit has proved to be very expedient in practice. However, due to the use of two longitudinal guide lanes spaced apart for lateral guidance with different arrangement of the conveyor drives, its use in many cases of applications was only possible under great difficulty for reasons of space and cost.

In another known driving arrangement for machining or assembly machines —according to U.S. Pat. Specification No. 4,014,428 —rotating belts are arranged guided vertically and laterally over roller arrangements. The workpiece carriers are supported via supporting limbs on two belt arrangements extending adjacently in parallel and therefore guided vertically and laterally via these belts, these belts at the same time transmitting the forward drive force onto the workpiece carriers. Due to the bilateral arrangement of the rotating belts, the outlay required for safeguarding devices in order to prevent injuries to operators is high or the arrangement of the belts below a table-top requires complicated receptacles and passages which are likewise extremely expensive in manufacture. Additionally, due to the simultaneous guidance and drive of the workpiece carriers by the belts, these are subject to great wear and the positioning accuracy of the workpiece carriers is not sufficient for many work processes.

The underlying object of the present invention is to provide a driving and guide device for workpiece carriers to be used in production plants for the manufacture or assembly of components, which device can be manufactured inexpensively and consists of as few single parts as possible, nevertheless allowing sufficiently exact positioning of the workpiece carriers in different regions along the conveying lane.

This object of the invention is achieved by the fact that two vertical guide lanes are arranged spaced apart across the conveying direction, which are assigned a belt-type driving element, and the feed device forms a lateral guide lane. The surprising advantage of the apparently simple solution is that the belt-type driving element charges the workpiece carriers with feed force and this feed device simultaneously effects the lateral guide device, that is to say the lateral guidance of the workpiece carrier.

However, it is also advantageous if the belt-type driving element is formed by a rotating toothed belt which extends parallel to the vertical guide lane and is guided laterally and vertically over two deflection rollers spaced apart in the conveying direction and coupled to a driving motor since, by this means, a lateral guidance of the workpiece carriers is achieved at the same time using the deflection rollers which are in any case required for the guidance of the toothed belt.

Another embodiment provides for the toothed belt to be arranged with the deflection rollers in a plane aligned perpendicular to the transport plane, by which means only the toothing projects upwards over the surface or the worktop in each lane section and this can consequently be used particularly advantageously in the field of manual workplaces since the risk of the operator getting jammed is ruled out.

However, it is also advantageous if the flanks facing away from each other or the circumference of the deflection rollers form lateral guide surfaces for lateral guide surfaces of the workpiece carrier since, by this means, not the belt itself but parts of the rotating deflection rollers of the belt are used for the lateral guidance of the workpiece carriers so that there is no sliding friction but a rolling friction between the workpiece carrier and the lateral guide lanes.

Furthermore it is also possible for the two lateral guide surfaces to form a guide duct which is approximately U-shaped or trapezoidal, is open towards the feed device and on the base of which a rack is arranged, by which means the lateral guide device not only effects the lateral guidance of the workpiece carrier as such but, at the same time, also effects a centering of the feed device on the workpiece carrier. Moreover, a vibration-free force transmission is achieved from the toothed belt to the rack.

However it is also possible for the toothed belt to be provided with a toothing on the side assigned to the rack and on the side opposite to the latter and for at least the deflection roller connected to the drive to be provided with a toothing, by which means the play between the driving motor and the toothed belt as well as between the toothed belt and the workpiece carrier can be reduced to a minimum and thus an exact feed movement is achieved.

Another further development provides for the feed device to be arranged between the two vertical guide lanes, preferably nearer to one of the two, and preferably for the rack and the axles of the guide rollers supported on the vertical guide devices, for example hardened guide strips, to be arranged essentially in a plane extending parallel to the transport plane since, by this means, the production of tipping moments is favourably prevented and nevertheless access to the workpiece carrier or the components is still possible from below the vertical guide device, that is to say through the table-top bearing the vertical feed device.

Furthermore, it is also possible for the deflection rollers of the feed device and the driving motor assigned to the belt-type driving element to be mounted on a common carrier plate which is fixed in a table-top or a support frame for an assembly or machining station so that a simple construction of the driving device and a rapid exchange is achieved in the case of a disturbance to the drive, in particular by exchanging the entire carrier plate with the driving motor.

However, it is also advantageous if the vertical guide lanes or the guide strips forming the latter and the belt-type driving element project over a topside of a table-top. Due to the risk of being jammed for workers, in particular in the field of manual workplaces, hazardous recesses in the table-top are prevented by the projecting arrangement which also achieves the fact that driving arrangements of this type of design can also be used for the transport of workpiece carriers in the field of manual workplaces without additional safety devices.

Another variant of an embodiment provides for the rack to have a length which is greater than a distance extending in the conveying direction between two feed devices arranged successively, by which means a seamless continuous feed of the workpiece carriers is guaranteed even in the transitional area between two subsequent feed devices.

However, it is also possible for the driving motor to be formed by a stepping motor which is assigned a control unit. By this means, the position in which a workpiece carrier is to be stopped can be specified in a simple manner and changed at any time.

However, it is also advantageous if a sensing member is arranged at a preset distance before a machining or assembly point and the driving motor or the toothed belt is rotated further after activation of this interrogation member by a specified number of steps since, by this means, the zero point is always specified before triggering the measurement process, by which means the feed routes can be maintained exactly even when using stepping motors.

A further development provides for the toothed belt to be provided on the side facing the rack with a pointed toothing and on the side assigned to the deflection rollers with a flat toothing, by which means the bumping of tooth on tooth with the toothed belt and the rack can be reliably prevented and, on the other hand, a slip-free carriage and positioning of the toothed belt, setting out from the deflection roller connected to the driving motor, is ensured.

However, it is also possible for at least one lateral surface to be inclined in the direction of a longitudinal mid-axis of the workpiece carrier with an increasing distance from the vertical guide lane and the lateral surface to be supported on lateral guide rollers inclined in opposite directions and the opposite lateral surface to be guided on supporting rollers, the rollers assigned to one lateral surface preferably being resiliently deformable or being mounted adjustably transversely to the vertical guide lane, by which means these can be implemented additionally using simple means in areas in which a very high requirement is placed on the lateral centering of the workpiece carriers.

However, it is also advantageous if a simple rotating toothed belt is arranged parallel to the vertical guide lane and in a plane extending parallel to the transport plane, of which the belt surface facing away from the toothing is assigned to the lateral surfaces of the workpiece carriers since, by this means, a transmission of force without play is achieved between the driving motor and the toothed belt and a large friction surface is available between the lateral flank and the toothed belt for the transmission of the feed forces.

Another further development provides for at least one supporting roller to be provided between the deflection rollers for the toothed belt spaced apart in the longitudinal direction of the vertical guide lane, which supporting roller effects a pressing force exerted in the direction of the lateral surface of the workpiece carrier. By this means, an exact vertical guidance of the workpiece carriers can also be achieved in addition to an exact lateral guidance.

Furthermore, it is also possible for the deflection rollers of the toothed belt to be adjustable via a spring device transversely to the vertical guide lane, by which means a uniform pressing force can be achieved between the toothed belt and the lateral flank of the workpiece carrier over the entire length of the toothed belt.

Furthermore, it is advantageous if lateral guide rollers, for example roller bearings or needle bearings, rotating about axles extending perpendicular to the transport plane are assigned to the lateral surface of the workpiece carrier opposite to the toothed belt since, by this means, the operation can also be carried out using higher lateral pressing forces between the toothed belt and the workpiece carrier without there being a risk of the workpiece carriers slipping out from or falling off the vertical guide devices.

Another further development provides for the feed device to be arranged in a bucket-shaped holding device which is mounted rotatably via a bearing device in a support structure and a gear wheel is connected to the holding device and arranged parallel to the transport plane, to which gear wheel a feed device, arranged in a plane extending parallel to said gear wheel and supported on the support structure, is assigned, by which means a common feed device is sufficient both for the feed of the workpiece carriers and for the drive of rotatable lane sections.

For better understanding of the invention, it is explained in greater detail below with reference to the exemplary embodiments illustrated in the drawings, in which:

FIG. 9 shows a view from below and simplified diagrammatic illustration of the feed device according to FIGS. 7 and 8;

FIG. 10 shows a lateral view, cut open, of a part of the feed device with a workpiece carrier entering said feed device;

FIG. 11 shows a lateral view, cut open, of a part of a toothing of the toothed strip of a running gear according to FIG. 10;

FIG. 12 shows a plan view and simplifed diagrammatic illustration, cut open along the lines XII—XII in FIG. 13, of another variant of an embodiment of a feed device for a lane section with a toothed belt rotating in a horizontal plane;

FIG. 13 shows a front view, cut open along the lines (XIII—XIII in FIG. 12, of the feed device according to FIG. 12.

Figure 1:
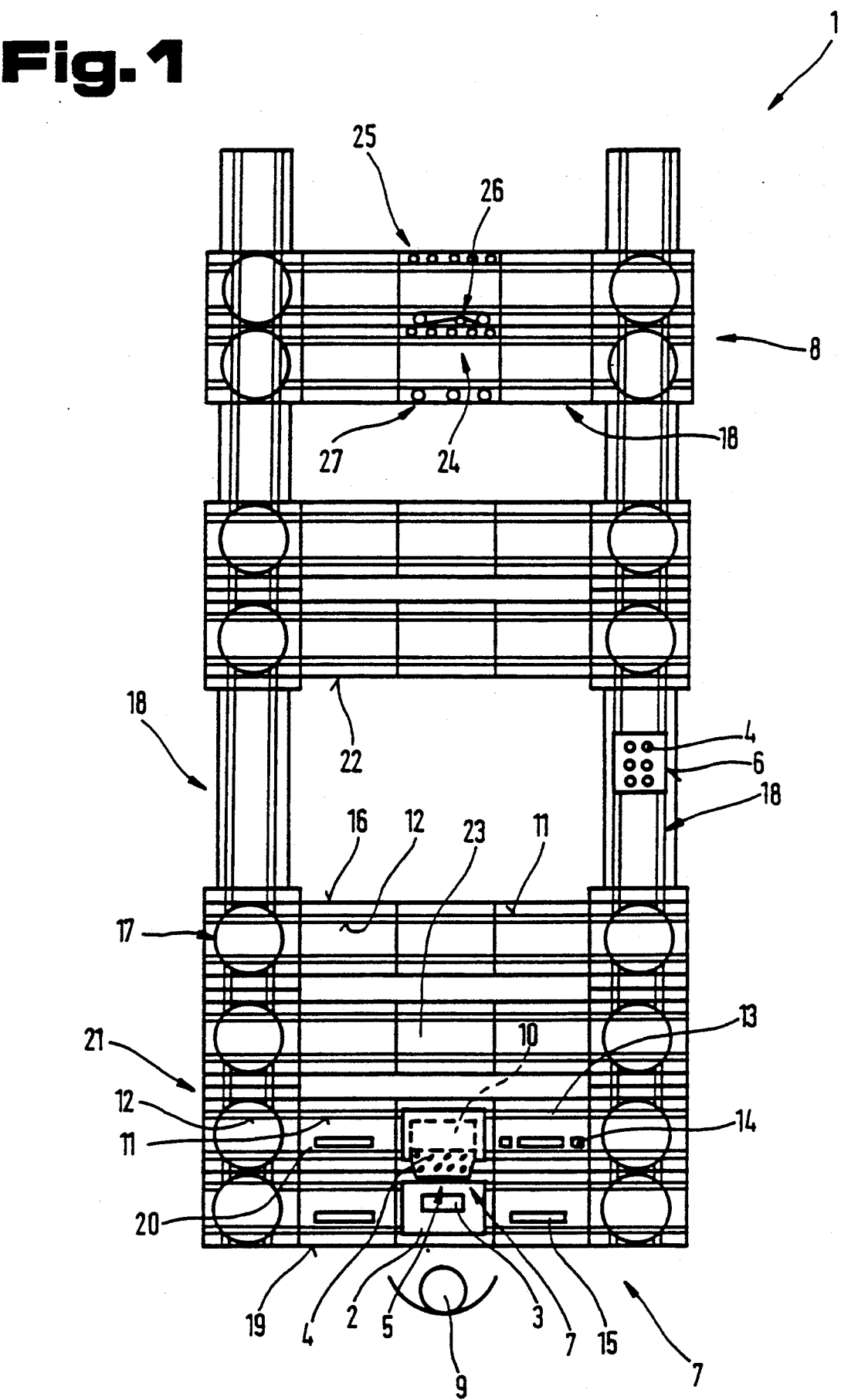
FIG. 1 shows a plan view and a simplified diagrammatic illustration of a production plant composed of a plurality of lane sections in a rectangular shape with feed devices of various designs according to the invention.

FIG. 1 shows a production plant 1 which is used for the machining or assembly of components 3 arranged on workpiece carrier 2. These components 3 are composed of a multitude of single parts 4 which are made available for assembly in containers 5 or pallet inserts 6. A production plant of this kind can comprise, for example, a work station 7 and a work station 8. At work station 7, the manipulation, joining and machining processes are undertaken by an operator 9 while work station 8 is constructed as a so-called CNC module, that is to say a fully automatic assembly or machining station. Identical workpiece carrier 10 preferably serves for moving the workpiece carrier 2 or the containers 5 or the pallet inserts 6, which workpiece carrier 10 can be moved along vertical and lateral guide lanes 13 and 14, formed by individual lane sections 11, 12, by means of feed devices 15 independently of one another, that is to say by means of so-called loose chaining, from one work station 7 to the other work station 8.

The individual lane sections 11, 12 are arranged on transport stations 16 or junctions 17. From the optionally arranged sequence of transport stations 16 or junctions 17, which can also be described as transport or junction modules since they advantageously have identical dimensions or can be coupled together in any positions, the main conveyor routes 18 or parallel conveyor routes 19 or minor conveyor routes 20 are formed which are required to construct a production plant 1 of this type. Transverse conveyor routes 21 can be provided to connect these main conveyor routes 18, parallel conveyor routes 19 and minor conveyor routes 20. Additionally, return conveyor routes 22 and storage conveyor routes 23 can also be provided in order to allow multiple passing of the same workpiece carrier 2 through one main conveyor route 18 or one parallel conveyor route 19 past an operator 9.

Feed devices 15 and 26 or 27 of different design then be arranged for these transport stations or junctions 16 and 17 or transport stations 24, 25 in the region of work station 8.

Figure 2:
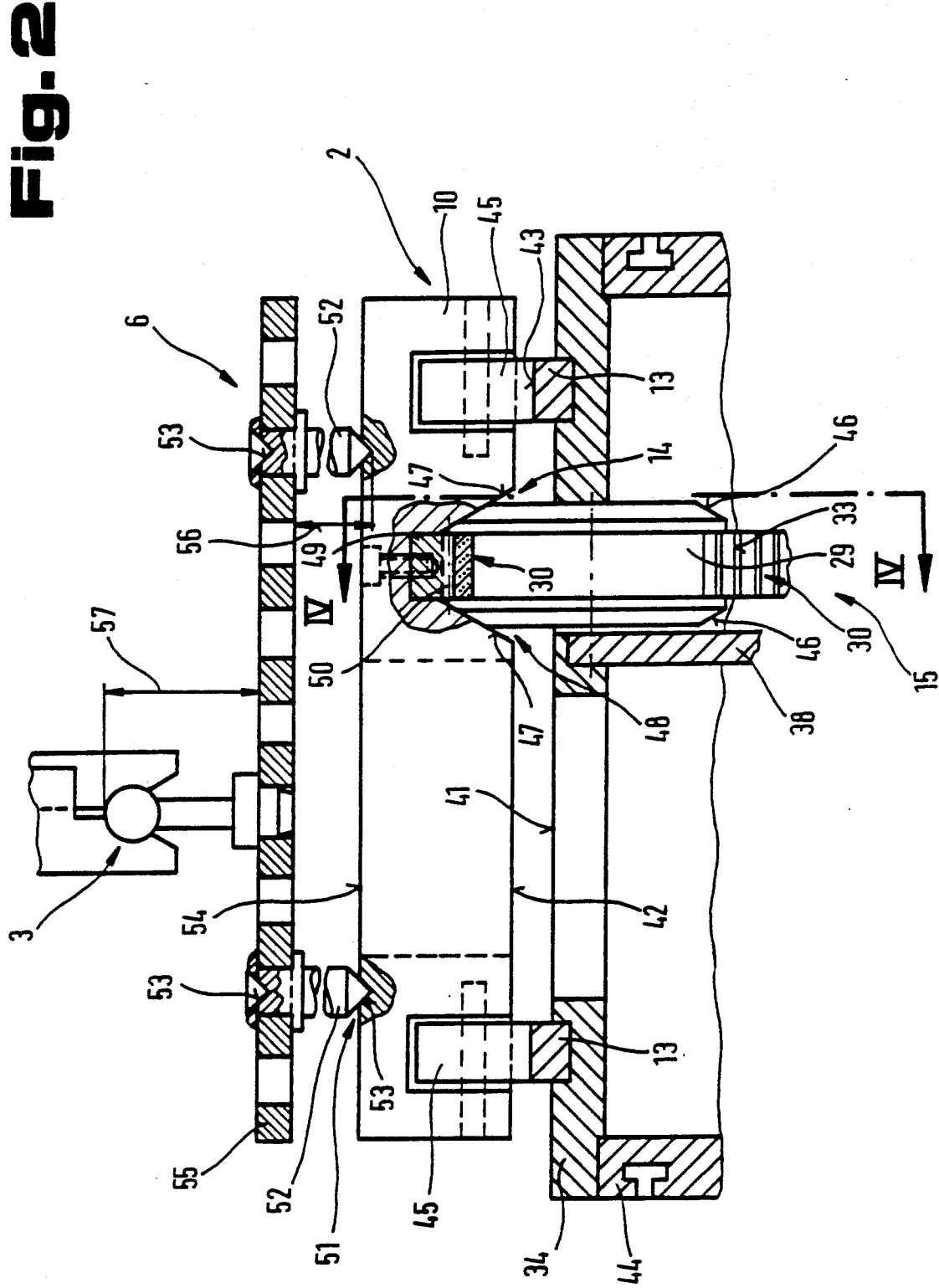
FIG. 2 shows a front view, cut open along the lines II—II in FIG. 4, of a lane section with a feed device arranged between the vertical guide device.
Figure 3:
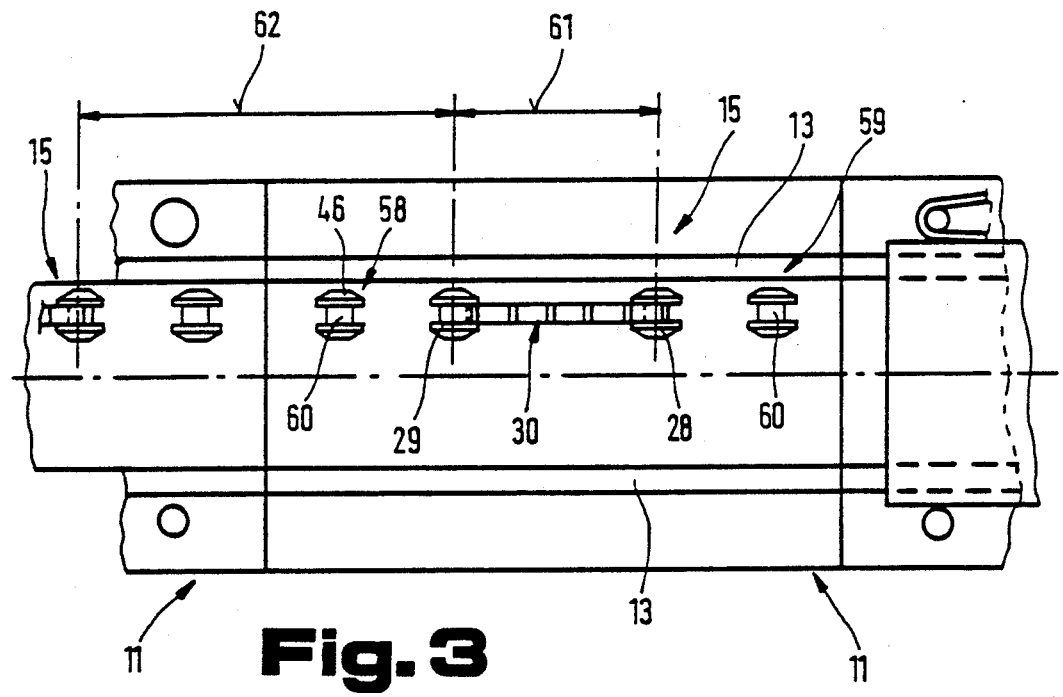
FIG. 3 shows a plan view of the lane section according to FIG. 2.
Figure 4:
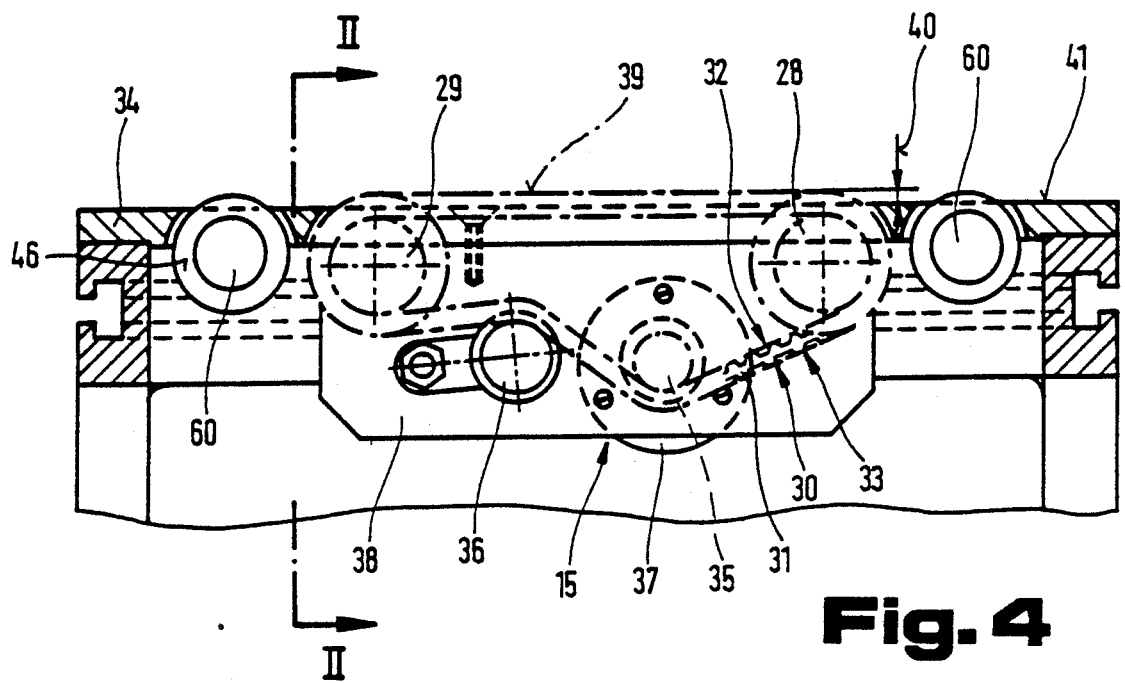
FIG. 4 shows a lateral view, cut open along the lines IV—IV in FIG. 2, of a lane section according to FIGS. 2 and 3.

FIGS. 2 to 4 show a feed device 15 which comprises a belt-type driving element 30 trained over deflection rollers 28, 29. This belt-type driving element 30 is constructed as a toothed belt 31 which is fitted both with a toothing 32 on the side facing the deflection rollers 28, 29 and with a toothing 33 on the side facing away from said toothing 32.

The toothed belt 31 is guided between the two deflection rollers 28, 29 on the side facing away from a table-top 34 over a drive pinion 35 and a tension roller 36. The drive pinion 35 is connected to a drive shaft of a driving motor 37 for common rotation movement. The driving motor 37, the deflection rollers 28, 29 and the tension roller 36 are arranged on a common carrier plate 38. The carrier plate 38 is attached to the table-top 34. The carrier plate 38 is attached in such a way that a topside 39 of driving element 30 only projects by a slight distance 40 over a surface 41 of the table-top 34. The slight distance 40, which is preferably equal to or smaller than the average thickness of a human finger, prevents the operators' fingers from being jammed between the surface 41 of the table-top 34 and an underside 42 of the workpiece carrier 10 facing away from said table-top in a manual workstation. For this reason, it is also advantageous if a distance between a surface 43 of the steel strips of the vertical guidance 13 inserted, for example, in the table top 34 and the surface 41 of the table-top 34 is not greater than distance 40.

As can also be seen from the illustration in FIG. 2, the table-top 34 is attached to a support frame 44. The workpiece carrier 10 is supported via guide rollers 45 on the vertical guide lanes 13. A lateral guide lane 14 for the workpiece carier 10 is formed by lateral guide surfaces 46 of the deflection rollers 28, 29. These lateral guide surfaces 46, together with the lateral guide surfaces 47 arranged in the underside 42 of the workpeice carrier 10 form a guide duct 48 which has an approximately trapezoidal cross-section and whose end facing the underside 42 is open. In the region of the upper part of the guide duct 48, extending parallel to the underside 42, a rack 49 is inserted, the toothing 50 of which faces the driving element 30.

Due to the construction of the lateral guide surfaces 46, of the deflection rollers 28, 29 and due to the arrangement of the rack 49 in the guide duct 48, at the same time as the lateral guidance of the workpiece carrier 10 a centering of the rack 49 is achieved on the driving element 30. This ensures at the same time a reliable and central engagement of the toothing 33 of the toothed belt 31 in the toothing 50 of the rack 49.

As can also be seen from the illustration in FIG. 2, the pallet insert 6 is placed on top of the workpiece carrier 10, which pallet insert is supported on the workpiece carrier 10 via a clutch device 51. In the simplest case, the clutch device 51 consists of centering journals 52 which are provided with conical ends. These conical ends of the centering journals 52 are inserted in opposite conical receptacles 53 which are arranged in a surface 54 of the workpiece carrier 10. Due to the dead weight of the pallet insert 6, the latter is coupled in an exact position to the workpiece carrier 10. The centering journal 52 holds a support plate 55 of the pallet insert 6 and, as shown diagrammatically, is provided at its end facing away from the conical point with a conical receptacle 53. These conical receptacles 53 then allow a plurality of pallet inserts 6 to be stacked one above the other in a centered position.

Moreover, if the length 56 of the centering journals 52 is selected such that it is at least slightly greater than a length 57 measured perpendicular to the support plate 55, the individual pallet inserts 6 can be stacked directly one above the other without additional aids or guide members.

As can also be seen better from the illustration in FIG. 3, in the course of one lane section 11 or 12, lateral guide members 58, 59 are arranged in the longitudinal direction of the vertical guide lanes 13 upstream and downstream from the belt-type driving element 30. The lateral guide members 58, 59 are formed by rollers 60 which can be mounted rotatably directly in the table-top 34. However, they can have a smaller circumference than the deflection rollers 28, 29 for example. In any case however, they are provided with lateral guide surfaces 46 corresponding to the lateral guide surfaces 46 of the deflection rollers 28, 29 so that the workpiece carrier 2 or the workpiece carrier 10 is also guided laterally during its movement along the vertical guide lane 13 by the lateral guide members 58, 59, that is to say for the point in time at which the guide duct 48 has not yet reached the deflection rollers 28, 29. By this means, undesired strong lateral deflections are reliably ruled out during the forward movement of the workpiece carrier 10 along the vertical guide lane 13.

Due to the arrangement of the additional lateral guide members 58, 59 it is furthermore also possible to reduce length 61 of the feed device 15 to a minimum, by which means inaccuracies due to different expansions of the belt-type driving member or vibrations due to a large span length between the deflection rollers 28 and 29 are avoided. Despite this however, the length 61 of the feed device 15 is to be selected such that a distance 62 between the successive feed devices 15 of two lane sections 11 arranged successively in the longitudinal direction of the vertical guide lane 13 is smaller than a length of the rack 49 on the workpiece carrier 10. This ensures that a seamless feed of the workpiece carrier 10 over the adjoining lane sections 11 or 12 is possible. However, a further advantage is that, due to this embodiment, the same feed devices 15 can also be used in the region of the lane sections 12, which are arranged in the region of the junctions 17, as in the region of the transport stations 16.

A continuous lateral guidance of the workpiece carrier 10 is achieved by the lateral guide members 58, 59 in the transition region between adjoining lane sections 11 of the transport stations 16.

Figure 5:
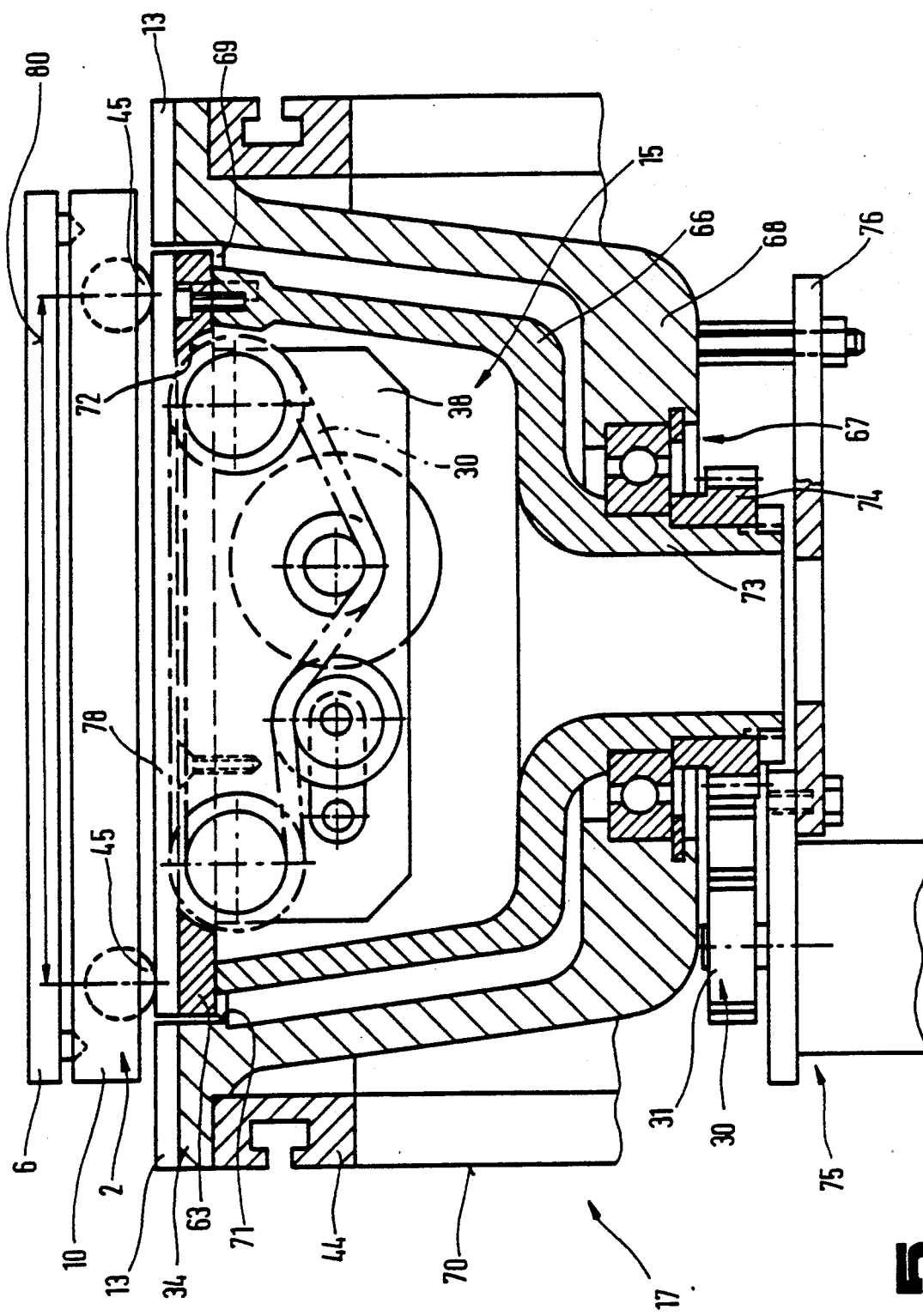
FIG. 5 shows a lateral view, cut open along the lines V—V in FIG. 6 in a simplified diagrammatic illustration, of another embodiment of a lateral guide device in conjunction with a feed device arranged between the vertical guide devices.
Figure 6:
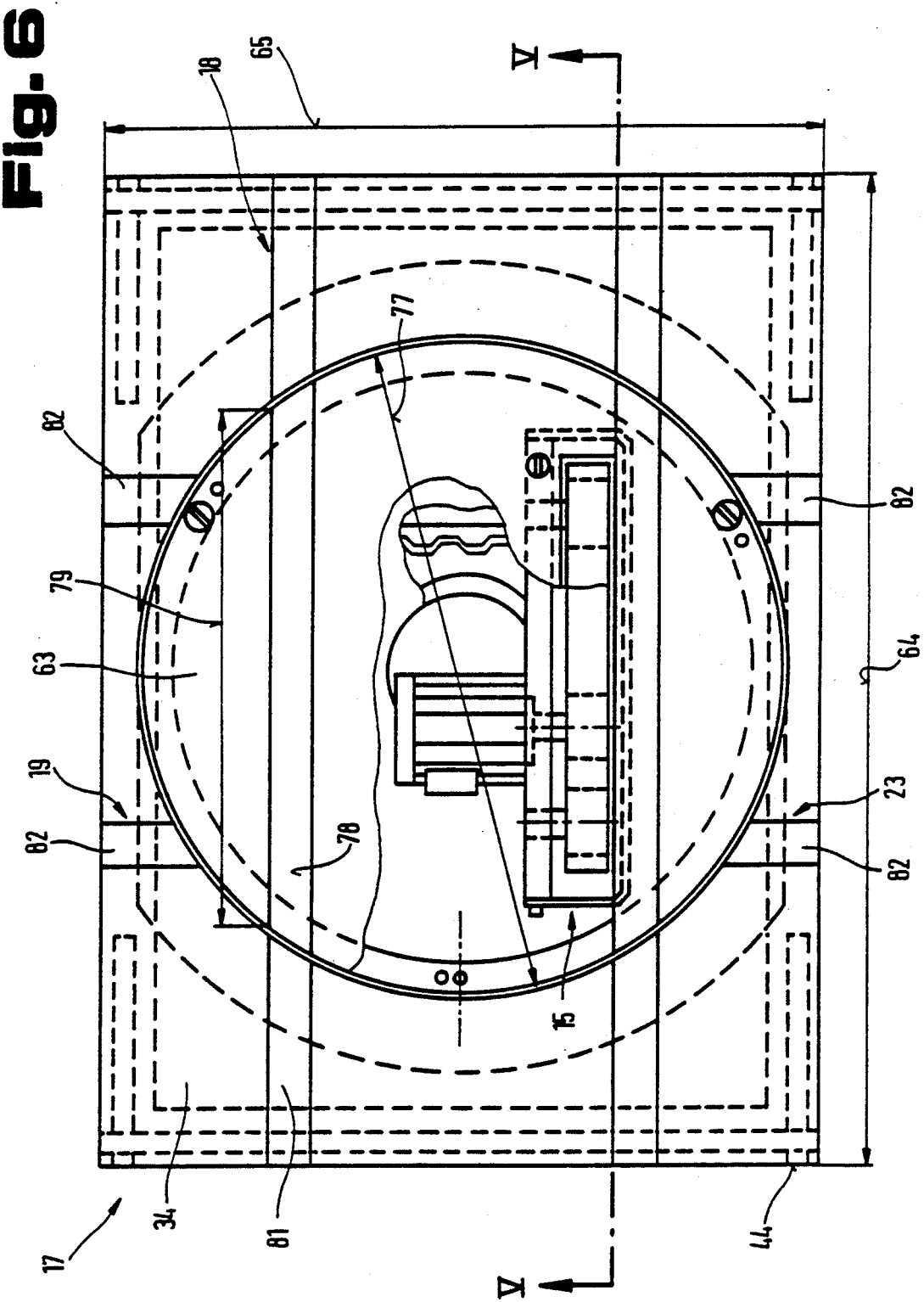
FIG. 6 shows a plan view in a simplifed diagrammatic illustration of a lane section according to FIG. 5.

A junction 17 is shown in FIGS. 5 and 6. This junction 17 is distinguished from the transport stations 16 by the fact that the feed device 15 is not arranged on the table-top 34 but in a turntable 63. Since the support frame 44 of the junction 17 has exactly the same outer dimensions, above all the same length 64 and the same width 65 as the transport station 16, the same feed device 15 can be used both for the transport station 16 and for the junction 17. Correspondingly, the same reference numerals as in FIGS. 2 to 4 are used for the same parts of the feed device 15.

The turntable 63, in which the feed device 15 is attached by means of a carrier plate 38, is arranged on a holding device 66 which is of pat-shaped construction. The holding device 66 is mounted via a bearing device 67 in a support structure 68 which is connected to the table-top 34 or is manufactured integrally with the latter. The table-top 34 has an opening 69 to receive the turntable 63, the dimensions of which opening correspond essentially to the diameter of the turntable 63. The vertical guide lane 13 extends on this table-top 34 in each case between a front face 70 and a front edge 71. In the same manner, there are likewise vertical guide lanes 13, which can be formed, for example, by hardened or ground guide strips, extending on both sides of the feed device 15. The feed device 15, as already in the table-top 34, is also arranged in the turntable 63 in a recess 72 of the latter. For relative adjustment of the turn-table 63 in relation to the table-top 34, the holding device 66 projects over the support structure 68 in the direction facing away from the table-top 34. Attached to the shoulder 73 projecting over the support structure 68 is a gear wheel 74 which engages with the belt-type driving element 30 of a further feed device 75. This feed device 75 can likewise be constructed corresponding to the feed device 15 and is attached either directly to the support structure 68 or to a supporting structure 76 connected to the support structure 68. By rotating the belt-type driving element 30, for example the toothed belt 31, the turntable 63 can be set relative to the turntable at any angle positions about a complete circle, that is to say about 360°. Besides this, by the use of a belt-type driving element 30 and of the elastic properties inherent in the latter, a jolt-free acceleration and deceleration is achieved when rotating the turntable 63 in relation to the table-top 34.

As can also be seen in particular in FIG. 6, the width 65 of the support frame 44 is only slightly greater than a diameter 77 of the turntable 63. In this case, it is advantageous if the parts 78 of the vertical guide lane, for example hardened and ground steel strips and/or high-strength plastic parts, which are arranged on the turntable 63, have a length 79 which is at least slightly greater than a distance 80 between the axles of the guide rollers 45 of the workpiece carrier 10. In this case, the workpiece carrier 10 or the pallet insert 6 can project over the guide rollers 45 in one or both directions. However, it is advantageous if a length of the pallet insert 6 is shorter than the length 64 of the support frame 44. For this enables one workpiece carrier 10 or one pallet insert 6 or one container 5 to be arranged in each case in successive lane sections without the workpiece carrier 10 or the pallet inserts 6 or the containers 5 adjoining.

This construction advantageously allows the individual support frames 44 to be arranged mutually transversely to their longitudinal direction with their longitudinal sides immediately adjacent to one another with the smallest possible distance between the lane sections, by which means the travel routes of handling devices spanning the lane sections or the manipulation routes of operators in the field of manual workplaces are kept as short as possible. By this means, savings of both time and costs can be achieved when carrying out the manipulation or joining processes. In this case however, in the region of junctions 17 in which the workpiece carrier 10 is moved from a main conveyor route 18 to a parallel conveyor route 19 or a storage conveyor route 23, when rotating the turntable 63' attention must be paid to the fact that the workpiece carrier 10 or the pallet insert 6 can project over the housing part 44 and, accordingly, no workpiece carrier 2 or pallet inserts 6 or containers 5 may be arranged in the two support frames immediately adjacent to this support frame 44 in the region of the longitudinal sides.

In order to connect the turntable 63 or the parts 78 of the vertical guide lane arranged on said turntable to the parallel conveyor route 19 or the storage conveyor route 23, parts 82 of the vertical guide lane are assigned to parts 81 of the vertical guide lane of the main conveyor route 18, for example at an angle of 90°.

Figure 7:
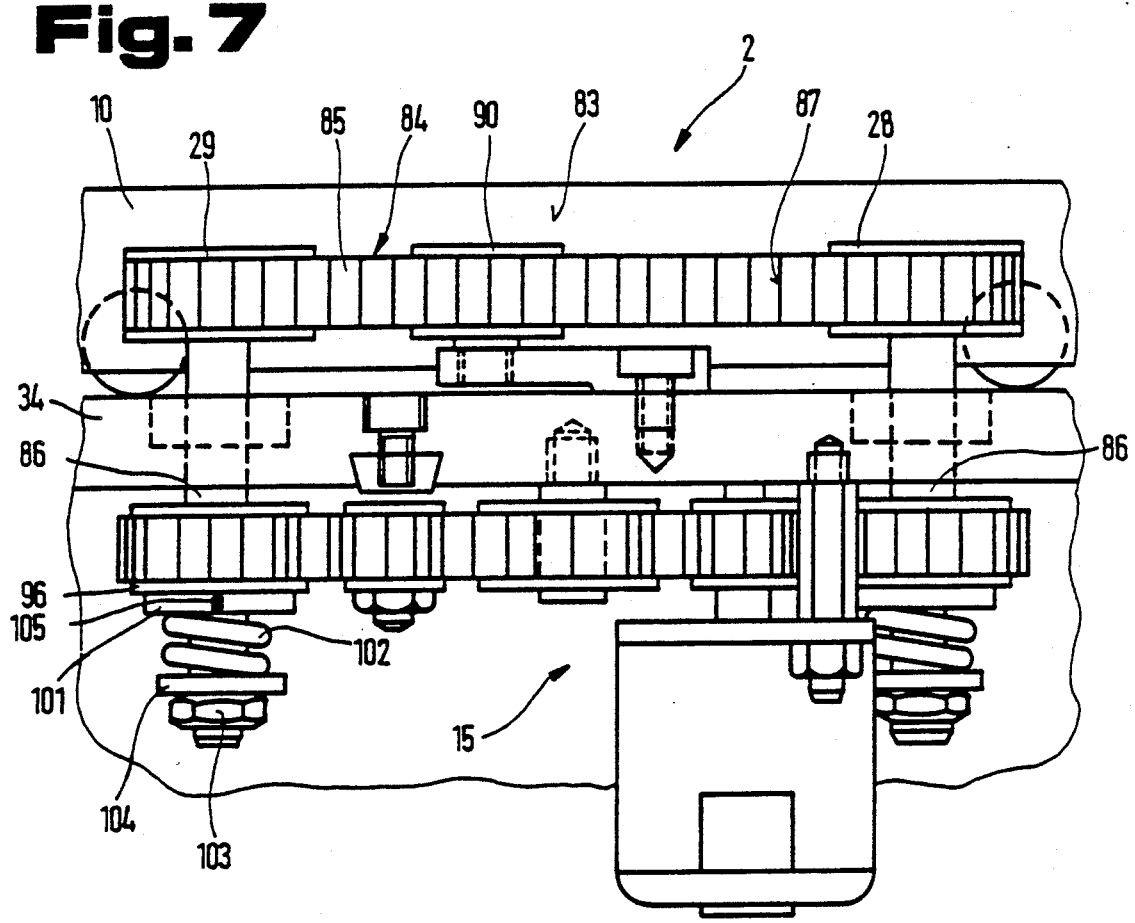
FIG. 7 shows a lateral view, cut open along the lines VII—VII in FIG. 8, of a lane section with a feed device assigned to the lateral flanks of the workpiece carriers.
Figure 8:
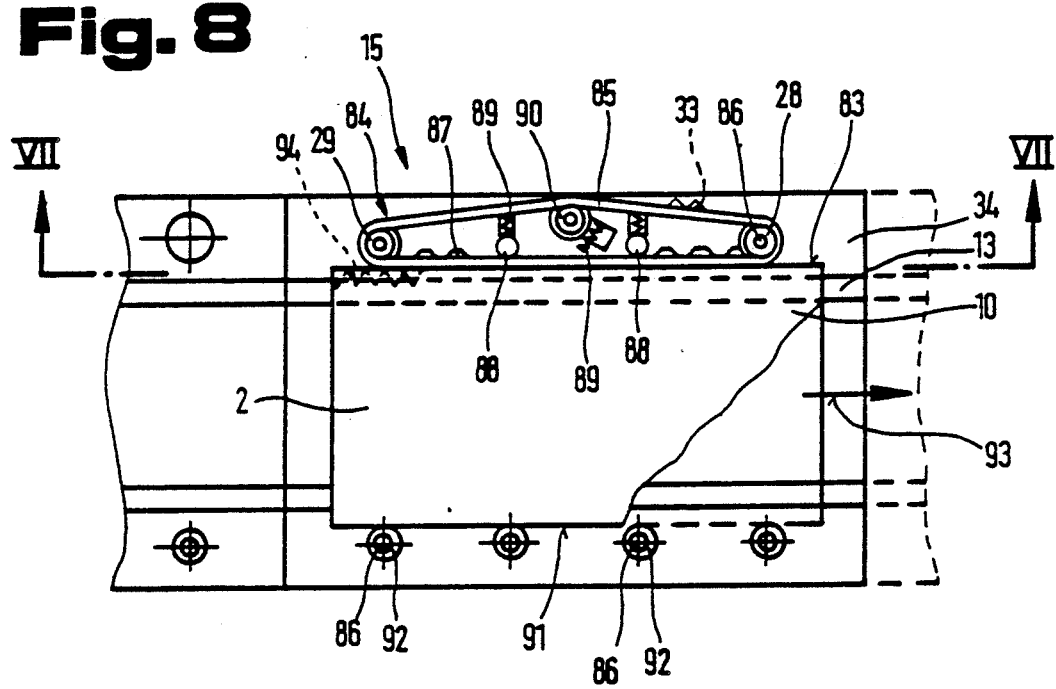
FIG. 8 shows a plan view and simplifed diagrammatic illustration of a lane section according to FIG. 7.

FIGS. 7 to 9 show a variant of an embodiment of a feed device 15, in which the lateral surfaces 83 of a workpiece carrier 10 are assigned a rotating belt-type driving element 84. The belt-type driving element 84, for example a toothed belt 85, is arranged in a plane extending parallel to a table-top 34 and is guided around two deflection rollers 28, 29 which are rotatable about axles 86 extending perpendicular to the table-top 34. A toothing 87 of the toothed belt 85 is arranged on the side facing the deflection rollers 28, 29. In order then to produce a sufficiently friction-tight fit between the lateral surface 83 of the workpiece carrier 10 and the belt-type driving element 84, even in the region between the deflection rollers 28, 29, supporting rollers 88 are arranged which, for example under the effect of a spring 89 having a predetermined force, press the belt-type driving element 84 against the lateral surface 83 of the workpiece carrier 2. By this means, a sufficiently friction-tight fit is ensured between the belt-type driving element 84 and the lateral surface 83 over the entire length of the workpiece carrier 2, by which means a precise and slip-free transport of the workpiece carrier 2 or the pallet inserts 6 or containers arranged on said workpiece carrier can be achieved. Of course, it is also possible for the deflection rollers 28, 29 to be constructed to be resiliently deformable, for example in the radial direction, so that they effect a pre-stressing force of the belt-type driving element 84 in the direction of the lateral surfaces 83 of the workpiece carrier 2. Additionally, it is also possible for the deflection rollers 28, 29 and the supporting rollers 88 to be arranged on a common carrier plate which are pressed via springs 89 or other resilient elements against the lateral surfaces 83 of the workpiece carrier 10.

In order to ensure sufficient tension of the belt-type driving element 84, a tension roller 90 is also provided between the deflection rollers 28, 29 which, for example under the effect of a spring 89, presses outwards away from the vertical guide lanes 13 and, by this means, any change in the length of the belt-type driving element 84, caused by the misalignment of the supporting rollers 88, is balanced out.

In order to achieve a guidance of the workpiece carrier 10 which is free from play and precise in terms of position, the workpiece carrier 10 are supported with their lateral surface 91 opposite the lateral surface 83 on lateral guide rollers 92 which are rotatable about an axle 86 likewise aligned perpendicular to the table-top 34. By this means, an exact position of the workpiece carrier 2 transverse to the conveying direction —arrow 93 —is achieved so that the exact place or position of the belt-type driving element 84 cannot have a disadvantageous effect on the precision of the positioning of the workpiece carrier 10 at the individual work stations 7 or 8.

With this embodiment it is, of course, also possible to equip the toothed belt 85 with a toothing 33 in addition to the toothing 87 on the opposite side to said toothing 87, as is indicated with dashed lines in FIG. 8. If the lateral surface 83 of the workpiece carrier 2 is also provided with an opposite toothing 94, as is likewise indicated with dashed lines, an arrangement of this kind can also achieve a slip-free and exact positioning of the workpiece carrier 10 in the direction of the arrow 93, that is to say the feed direction of the workpiece carrier 10.

FIG. 9 also illustrates the transmission of force between the driving motor 37 and the axles 86 or driveshafts of the deflection rollers 28 and 29. The driving motor 37 or its motor shaft is connected fixedly in terms of rotation to the driving pinion 35, for example by means of a clamping fit with interposition of a spring or a wedge. A toothed belt 95 wraps around pulleys 96 which are connected fixedly in terms of rotation to the axles 86. The pulleys 96 are provided with a toothing which interacts with the toothing 97 of the toothed belt 95. A toothing 98 applied to the outside of the toothed belt 95 meshes with the driving pinion 35 of the driving motor 37. The driving pinion 35 is offset in relation to a tangent placed on the two pulleys 96 in the direction of the opposite strand of the toothed belt 95 so that the toothed belt 95 wraps around the pulley 96 with an angle greater than 180°. In order also to achieve an adequate wrapping of the toothed belt 95 in the case of the driving pinion 35, a deflection roller 99 is arranged between the two pulleys 96 about which the toothed belt is passed again approximately in the region of the tangent connecting the two pulleys 96. Arranged between the deflection roller 99 and the pulley 96 situated further away from the driving motor 37 is a tension roller 100 which is pressed under the effect of a spring 89, e.g. a compression spring, against the toothed belt 95. The deflection roller 99 and the tension roller 100 are advantageously not provided with a toothing, so that the changes in length of the belt are balanced out smoothly and additional tensions or expansions of the toothed belt 95 are ruled out.

As can be seen better in FIG. 7, the nonpositive connection is effected between the axle 86 and the pulleys 96 via friction plates 101 which are pressed against the lateral flank of the pulleys 96 by means of springs 102. A supporting plate 104 is positioned via a nut 103 which is screwed onto a part of the axle 86 which is provided with a thread and this means predetermines the pre-stressing force of the spring 102, by means of which the friction plate 101 is pressed against the lateral flank of the pulley 96. The friction plate 101 is connected in terms of rotation to the axle 86, for example by means of a pin 105 passing through said axle. If the friction force between the friction plate 101 and the pulley 96 is then greater than a blocking force exerted by the adjacent toothed belt 85 on the (lacuna) on the lateral surface 83 of the running gear 10, the rotational movement of the toothed belt 95 is transmitted to the toothed belt 85. If a workpiece carrier 10 is retained in the region of the toothed belt 85, for example by a positioning device or a stop, in a pre-selected work position, the friction force between the lateral surface 83 of the workpiece carrier 10 and the toothed belt 85 is greater than the friction force between the friction plate 101 and the pulley 96, which causes the pulley 96 to spin alone. It is achieved by this means that, during a stoppage of a workpiece carrier 10 in the region of the feed device 15, excessive wear on the toothed belt 85 is prevented or the toothed belt 85 can also be provided with a toothing on the side facing the lateral surface 83 since destruction of the toothing on the toothed belt 85 or in the lateral surface 83 is prevented by the friction plate 101 acting as a friction clutch in interaction with the pulley 96.

Moreover, due to the possibility of adjusting the friction force between the friction plate 101 and the pulley 96, predetermined friction values can be set exactly in a simple manner.

At the same time, due to the arrangement of a friction clutch of this type between a toothed belt 95 driving the two deflection rollers 28, 29 and the toothed belt 85 adjacent to the workpiece carrier 10, a smooth deceleration or acceleration is achieved due to the build-up of the friction force in the friction clutch.

FIGS. 10 and 11 show the entry of a workpiece carrier 10 into the region of a feed device 15, as was described for example with reference to FIGS. 2 to 6. As can be seen better in this illustration, the toothing 33 of the belt-type driving element 30 is constructed in the manner of a pointed toothing in which tooth profiles 106 converge essentially to a point. If the toothing 50 of the rack 49, which is connected in terms of movement to the workpiece carrier 10, is also fitted with relatively slim teeth, it can be achieved in a simple manner that in each case a tooth 107, for example of the toothed belt 31, engages in a tooth space 108 of the rack 49. Bumping of a tooth 109 of the rack 49 on the tooth 107 and, caused by this, lifting of the workpiece carrier 10 from the vertical guide lane 13 is thus reliably avoided.

It can also be seen from this diagrammatic illustration that a distance 62 between the deflection rollers 28, 29 of successively arranged feed devices 15 is smaller than a distance 80 between the axles of the guide rollers 45 of the workpiece carrier 10. This ensures that at least one feed device 15, 75 engages with the rack 49 of the workpiece carrier 10 over the entire conveyor route. Also in the transition area between one feed device 15, 75 and the other feed device 15, 75, the workpiece carrier 10 is only released from the feed device 15, 75 arranged upstream when engagement between the teeth 107 of the toothed belt 31 of the subsequent feed device 15, 75 has already been effected. Due to the rollers 60 arranged in addition to the deflection rollers 28, 29, a lateral guidance of the workpiece carrier 10 with a pallet insert 6 which may be arranged on it, is ensured even in those regions in which there is no toothed belt 31 or belt-type driving element 30. For this reason a short length of overlap between the rack 49 and the toothed belt 31 is sufficient which only has to serve the forward movement of the workpiece carrier 10 since the lateral guidance is effected during this time by the rollers 60. Additionally, in order to be able to position the workpiece carrier 10 in a simple manner in any position along the vertical guide lane 13 in the region of a work station, before such a work position 110, which is drawn in dot/dashed lines, an sensing member 111 is arranged which interacts, for example, with a marking 112 arranged on the workpiece carrier 10. The sensing member 111 is then arranged at a predetermined distance 113 before the work position 110. If the marking 112 of the workpiece carrier 10 then passes the sensing member 111, the relay of a signal from the sensing member 111 to a control unit 114 means that the distance 113 has yet to be overcome before reaching the desired work position 110. If the driving motor 37 is then constructed as a stepping motor, this distance 113 can be converted to a certain number of rotational steps of the driving motor 37 and the number of steps by which the driving motor 37 is to be rotated further, can be monitored by a nominal/actual value comparator 115. When the number of steps has been completed, the driving motor 37 is stopped. By this means, a relatively exact positioning of the workpiece carrier 10 in the region of the work position 110 is achieved.

Of course, the control unit 114, as indicated diagrammatically, can interact with an overriding control system or with the control device of the feed device 15 arranged upstream. If greater precision of positioning is required, it is also readily possible for any other measurement device to be used for monitoring the distance travelled by the workpiece carrier 10.

FIG. 11 also shows that a height 116 of the teeth 109 of the rack 49 decreases towards the front ends 117 of the workpiece carrier 10. Thus, for example, a height 116 of the teeth 118 to 120 is less than that of the teeth 109 of the rack 49. Additionally, a width 121 of the teeth 109 is greater than a width 122 of the tooth 118, the teeth 119 and 120 in any case being able to be of pointed construction. Due to the lesser height of the teeth 118 to 120, corresponding to an angle of entry 123, 124, in interaction with the design of the tooth profiles 106 of the teeth 107 of the toothed belt 31 a virtually jolt-free and reliable centering of the teeth 107 on the tooth spaces 108 or of the teeth 109 or 118 to 120 on the tooth spaces 125 of the toothed belt 31 can be achieved. Above all, due to the pointed design of the teeth 118 to 120, even in the case of an overlapping position of the toothed belt 31 or of the rack 49, the tooth 107 of the toothed belt is pushed away in the direction of the tooth space 108 with increasing engagement depth, by which means the raising of the workpiece carrier 10 or its being lifted from the vertical guide lane 13 is reliably prevented.

FIGS. 12 and 13 show another variant of an embodiment of a feed device 126, in which a workpiece carrier 10 is guided on vertical guide lanes 13. Lateral guide rollers 92 arranged between the vertical guide lanes and assigned to the underside 42 of the workpiece carrier 10 serve for the lateral guidance. A guide surface 127 of the running gear 10 is pressed onto these lateral guide rollers 92 by the effect of a belt-type driving element 30 which is pressed under prestress against a rack 49 arranged opposite to the guide surface 127. The rack 49 is provided with a toothing 50 into which a toothing 33 of the belt-type driving element 30 engages. As can be seen, the belt-type driving element is arranged in a plane extending parallel to the table-top 34 so that the deflection rollers 28, 29 are likewise arranged in a horizontal plane, as are the lateral guide rollers 92.

With this embodiment it is possible for the belt-type driving element 30, for example a toothed belt 31, to be driven directly via a driving pinion 35 of a driving motor 37. For this purpose, the toothed belt can likewise be provided with a toothing 32 on the inside so that a slip-free drive is produced between the driving motor 37 and the workpiece carrier 10 or a pallet insert 6 arranged on the latter.

The vertical guidance of the workpiece carrier 10 on the vertical guide lanes 13 is effected via guide rollers 45 which are likewise arranged set into the workpiece carrier 10.

Of course, it is also possible to use an appropriate supporting strip instead of the lateral guide rollers 92 or to provide the deflection rollers 28, 29 or the supporting rollers 88 with guide discs arranged above them on which a guide surface 127 of the workpiece carrier 10 can be supported.

We claim:

1. A production plant for processing or assembling components transported on workpiece carriers in a conveying direction along a succession of adjacent guide sections, each guide section comprising two vertical guides defining a conveying plane for the workpiece carriers, the vertical guides extending in the conveying direction and being spaced from each other transversely to the conveying direction, and an independent feed device in each guide section for driving the workpiece carriers in the conveying direction, the feed devices beign independent of each other and of the vertical guides in each guide section, each feed device comprising
   (a) a toothed driving belt extending parallel to the conveying plane in the conveying direction,
   (b) two deflection rollers spaced from each other in the conveying direction and extending perpendicularly to the conveying plane, the toothed belt being trained over the deflection rollers and being vertically and laterally guided thereby, and each deflection roller including
      (1) respective circumferential lateral guide faces directed transversely in opposite directions, and
   (c) a drive motor arranged to drive the toothed driving belt about the deflection rollers, and
   (d) the workpiece carriers including
      (1) respective lateral guide faces engaged by the lateral guide faces of the deflection rollers whereby the engaging lateral guide faces of the deflection rollers and the workpiece carriers provide a lateral guide for the workpiece carriers, and
      (2) a rack engaging the toothed belt whereby the toothed belt drives the workpiece carriers upon being driven by the drive motor.

2. The production plant of claim 1, wherein the lateral guide faces of the workpiece carriers define a guide channel of trapezoidal cross section therebetween, the rack is disposed at the top of the guide channel and the toothed belt is arranged in the guide channel.

3. The production plant of claim 1, wherein the feed device is arranged off-center between the two vertical guides.

4. The production plant of claim 1, wherein the workpiece carriers have guide rollers engaging the vertical guides, and the rack and axes of the guide rollers extend in planes extending substantially parallel to the conveying plane.

5. The production plant of claim 1, further comprising a support for each guide section and a common carrier plate affixed to the support and supporting the drive motor and the flection rollers.

6. The production plant of claim 5, wherein the support comprises a support frame and a table-top mounted thereon, the table-top having a top surface, the vertical guides and the toothed driving belt in engagement with the rack projecting a distance above the top surface of the table-top.

7. The production plant of claim 1, wherein the rack has a length exceeding a distance extending in the conveying direction between the independent fee devices in adjacent ones of the guide sections.

8. The production plant of claim 1, wherein the drive motor is a stepping motor, and further comprising a control for the stepping motor.

9. The production plant of claim 8, wherein the control comprises a sensing member arranged at a predetermined distance from a processing or assembling point at respective ones of the guide sections, the sensing member actuating the control for rotating the motor a number of steps determined by the distance of the sensing member from the processing or assembling point.

10. The production plant of claim 1, further comprising a bucket-shaped holding device wherein the feed device is mounted for rotation about an axis extending perpendicularly to the conveying plane, a support structure for the holding device, the support structure including a bearing rotatably supporting the holding device on the support structure, a gear wheel connected to the holding device and arranged parallel to the conveying plane, and a device supported on the support structure, extending parallel to the gear wheel and engaging the gear wheel for driving the gear wheel and thereby rotating the holding device.

11. The production plant of claim 1, further comprising a respective lateral guide member disposed upstream and downstream of the feed device in the conveying direction, each guide member having respective circumferential lateral guide faces directed transversely in opposite directions and engaged by the lateral guide faces of the workpiece carriers whereby the engaging lateral guide faces of the guide members and the workpiece carriers provide a lateral guide for the workpiece carriers upstream and downstream of the feed device.

* * * * *

UNITED STATES PATENT AND TRADEMARK OFFICE
CERTIFICATE OF CORRECTION

PATENT NO. : 5,062,368

DATED : November 5, 1991

INVENTOR(S) : Walter Sticht et al

It is certified that error appears in the above-identified patent and that said Letters Patent is hereby corrected as shown below:

Cover page, item 73, lines 1-2, correct the assignee's name to read as follows: --STIWA-Fertigungstechnik Sticht Gesellschaft m.b.H.--.

Signed and Sealed this

Fourth Day of August, 1992

Attest:

DOUGLAS B. COMER

Attesting Officer

Acting Commissioner of Patents and Trademarks